G. R. Forsyth.
Pump.
Nº 72620        Patented Dec. 24, 1867.
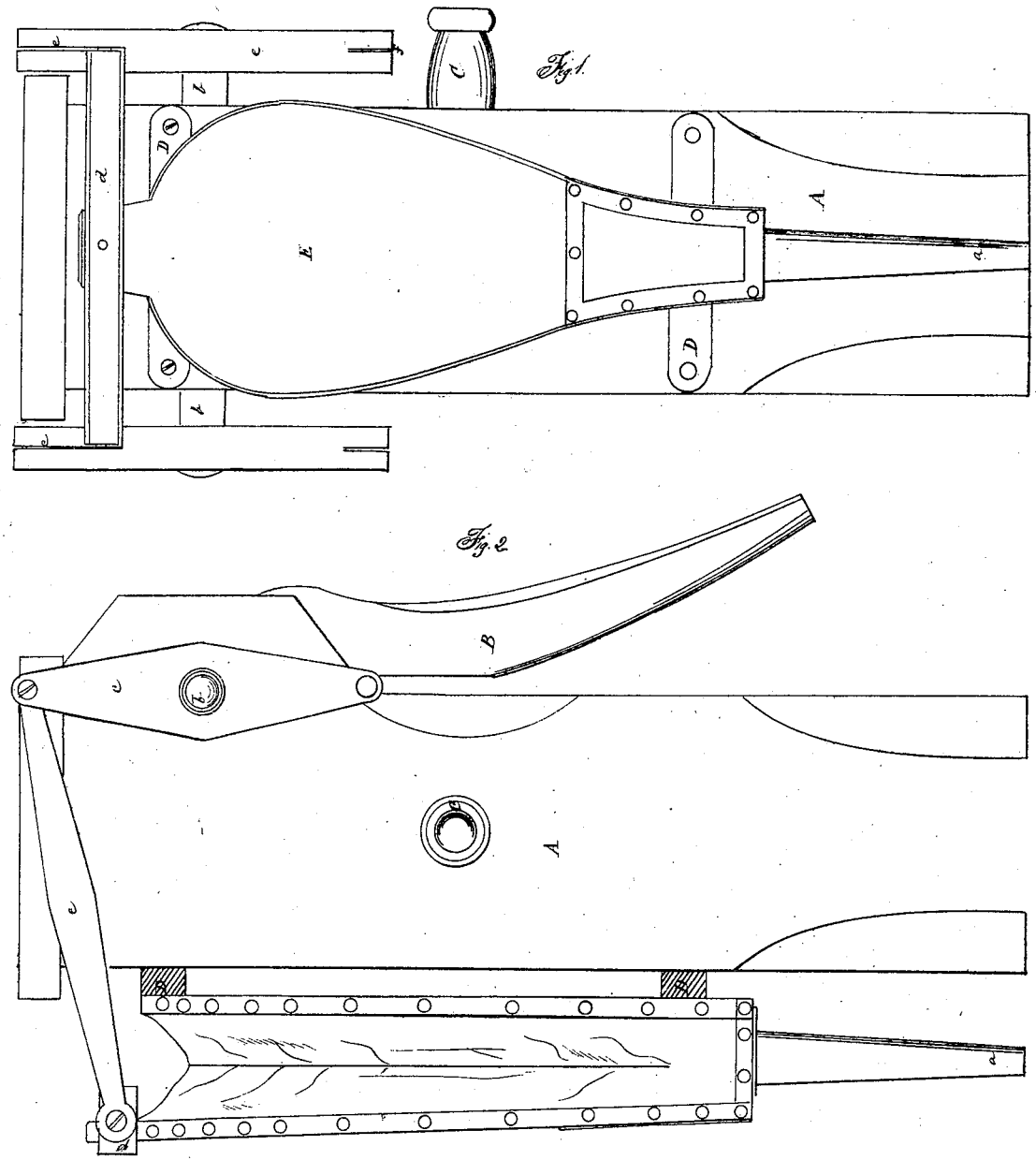

United States Patent Office.

G. R. FORSYTH, OF PEMBERTON, OHIO.

Letters Patent No. 72,620, dated December 24, 1867.

IMPROVEMENT IN PUMPS.

The Schedule referred to in these Letters Patent and making part of the same.

TO ALL WHOM IT MAY CONCERN:

Be it known that I, G. R. FORSYTH, of Pemberton, in the county of Shelby, and in the State of Ohio, have invented new and useful Improvements in Pumps; and I do hereby declare that the following is a full, clear, and exact description thereof, reference being had to the accompanying drawings, and to the letters of reference marked thereon.

The object of my invention is to furnish a convenient means of ventilating wells and cisterns, rendering the water in them wholesome and palatable, and preventing the accumulation of noxious and deleterious gases, which render the descent into them dangerous.

To accomplish the object of my invention, I attach an ordinary bellows to the pump-stock above the ground, with a pipe extending from the nozzle of the bellows down into the well, to near the surface of the water, the bellows being attached to the pump-stock opposite the handle, as shown in Figure 2, and actuated by the handle by the process of pumping.

Figure 1 is a rear elevation, and

Figure 2 a side elevation of a pump with a bellows attached.

A is the pump-stock, B the lever or handle by which it is operated, and C the spout. The bellows is attached to the pump-stock by means of blocks D D attached to the head E and to the pump-stock, or by any other convenient means by which it can be firmly secured to the stock. From the nozzle of the bellows a pipe, $a$, extends down along the pump-stock to near the surface of the water. The rod $b$, constituting the fulcrum of the lever B, extends a sufficient distance through the pump-stock to allow the rock-bars $c\ c$ to be rigidly attached to its ends. To the upper part of the head E' of the bellows is secured the horizontal bar $d$. By a joint attachment the arms $e\ e$ connect the rock-bars $c\ c$ to the bar $d$. The drawings represent the arms $e\ e$ as attached to the upper ends of the rock-bars.

By raising the handle B the bellows will be filled with air, and by forcing it down, the bellows will be closed and the air forced down through the pipe $a$ into the well, and the ascending current thus produced will free the well from any noxious vapors or gases that may have accumulated in it. If it is desired to close the bellows by raising the handle B, the arms $e\ e$ will be attached to the lower ends of the rock-bars $c\ c$ at $f\ f$.

It will readily be seen that my invention may be applied to almost any kind of a pump, whether operated by a lever or by a crank, with the aid of but very little mechanical skill. When applied to pumps operated by cranks, the arms $e\ e$ will be operated by cranks instead of rock-bars.

This invention furnishes a simple and convenient means of freeing wells, cisterns, &c., from impure and deleterious gases and preventing their accumulation, the presence of which has caused the loss of many lives.

What I claim as my invention, and desire to secure by Letters Patent, is—

The combination of the bellows with the pump, substantially as and for the purpose set forth.

In testimony that I claim the above-described improvements in pumps, I have hereunto signed my name, this 14th day of September, 1867.

G. R. FORSYTH.

Witnesses:
  ISAAC SHANELY,
  S. SHIDAKER.